United States Patent [19]

Wong

[11] Patent Number: 4,971,156

[45] Date of Patent: Nov. 20, 1990

[54] MULTI-SECTION CONTROLLED AUXILIARY FITTINGS TO BE ATTACHED TO A WRENCH

[76] Inventor: Jason Wong, 28-2, Lane 232, Hu-lin Street, Taipei, Taiwan

[21] Appl. No.: 401,256

[22] Filed: Aug. 31, 1989

[51] Int. Cl.$^5$ .............................................. B23Q 5/00
[52] U.S. Cl. ........................................ 173/12; 74/340
[58] Field of Search ............... 173/47, 48, 104, 12; 81/467; 74/340

[56] References Cited

U.S. PATENT DOCUMENTS 1,292,420  1/1919  Bergey .................................. 173/47
4,657,088  4/1987  Grossman et al. .................... 173/48

Primary Examiner—Frank T. Yost
Assistant Examiner—Willmon J. Fridie
Attorney, Agent, or Firm—Armstrong, Nikaido, Marmelstein, Kubovcik & Murray

[57] ABSTRACT

A multi-speed drive accessory for a tool which includes a first shaft, an output shaft, and a clutch for selectively engaging the first shaft with a coupling member driving a transfer shaft. The output shaft and the transfer shaft each include several gears which are selectively engageable with each other to establish different speed ratios in response to axial movement of the transfer shaft relative to the output shaft. A detent or latching arrangement is also provided to hold the transfer shaft in each axial position establishing one of the speed ratios.

5 Claims, 4 Drawing Sheets

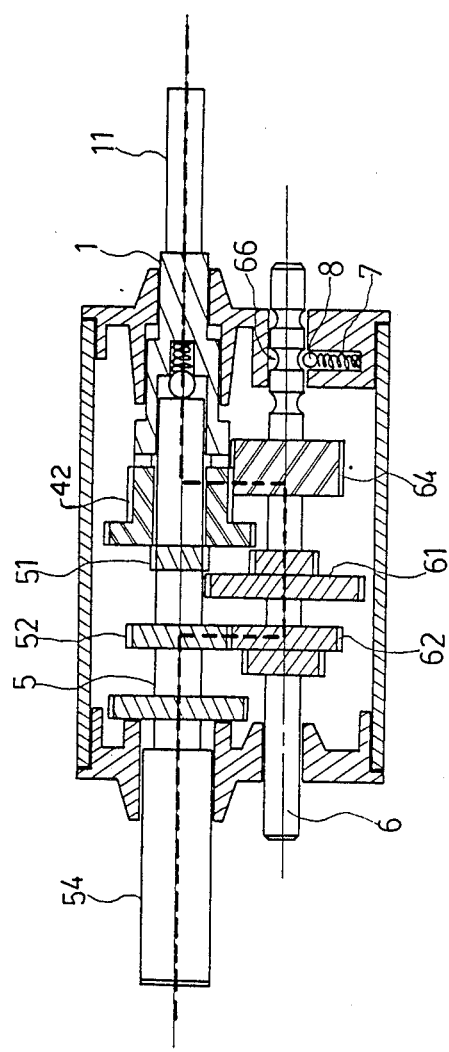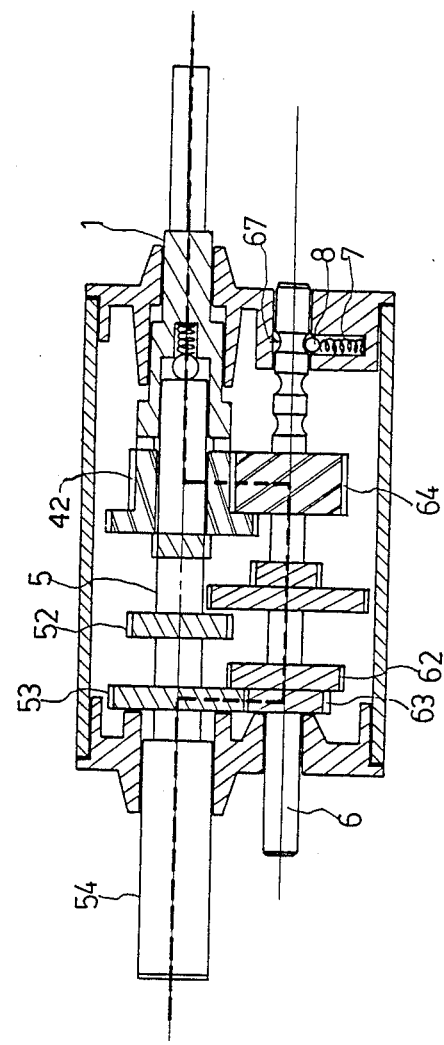

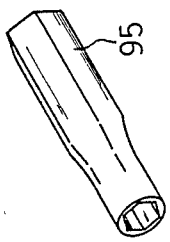
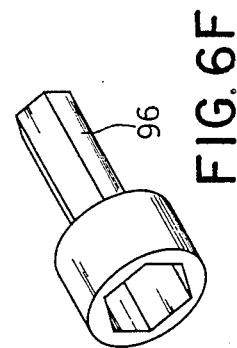
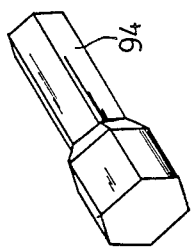
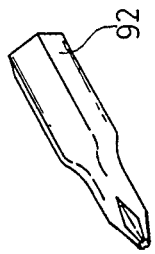
FIG. 6A
FIG. 6B
FIG. 6C
FIG. 6D
FIG. 6E
FIG. 6F

MULTI-SECTION CONTROLLED AUXILIARY FITTINGS TO BE ATTACHED TO A WRENCH

BACKGROUND OF THE INVENTION

The present invention is a multi-speed drive accessory for a tool. More specifically, the present invention is an accessory or supplemental device for selectively providing multiple speed outputs for a tool such as a wrench.

Generally speaking, a single function is usually found in the operation or application of an ordinary wrench having a hexagonal head. No matter whether it is a hexagonal wrench, a shifting wrench or a universal wrench, when is revolved for one circle, the screw will also revolve for one circle. Therefore, such ordinary wrenches are found to lack a rapid assembling or disassembling function. As a solution electrical or pneumatic automatic wrench is invented. Although an automatic type of wrench can achieve a rapid assembling or disassembling function, it will be of no effect if the screw happens to be disengaged with the thread or frozen as a result of rusting since its torque force is not variable and other methods such as the use of a lever, or raising its temperature by heating to produce an expansion/shrinkage effect of unfixing the screw will have to be employed. Therefore, it is concluded that defects are inevitably found in various kinds of tools, particularly when such tools are lacking of any supplementary device that makes perfect work quite impossible.

In view of the aforementioned defects, the inventor has devoted himself in a continuous research and renovation, and managed to successfully develop a multi-speed controlled accessory or supplemental device for a wrench, by means of which a more perfect work can be achieved.

SUMMARY OF THE INVENTION

The present invention is a multi-speed drive accessory for a tool which includes a first shaft, an output shaft, and clutch means for selectively engaging the first shaft with a coupling member driving a transfer shaft. The output shaft and the transfer shaft each include a plurality of gears selectively engageable with each other to establish different speed ratios in response to axial movement of the transfer shaft relative to the output shaft. A detent or latching arrangement is also provided to hold the transfer shaft in each axial position establishing one of the speed ratios.

The present invention provides a number of advantages which include: use with various types of tools, different speed ratios may be selected for different purposes, and it may be used with various types of tool heads to install and withdraw different types of fasteners.

These and other objects, features and advantages of the present invention will become more fully apparent from the following detailed description of the preferred embodiment taken in conjunction with the appended claims and the accompanying drawings.

BRIEF DESCRIPTION OF THE DRAWINGS

FIG. 4 is a plan view like FIG. 3, but showing the operative elements engaged in a second driving ratio;

FIG. 5 is a plan view like FIG. 3, but showing the operative elements engaged in a third driving ratio; and FIGS. 6A-6F illustrate various tools which may be driven by the output shaft of the device shown by FIGS. 2-5.

DETAILED DESCRIPTION OF THE PREFERRED EMBODIMENTS

Figure 1:
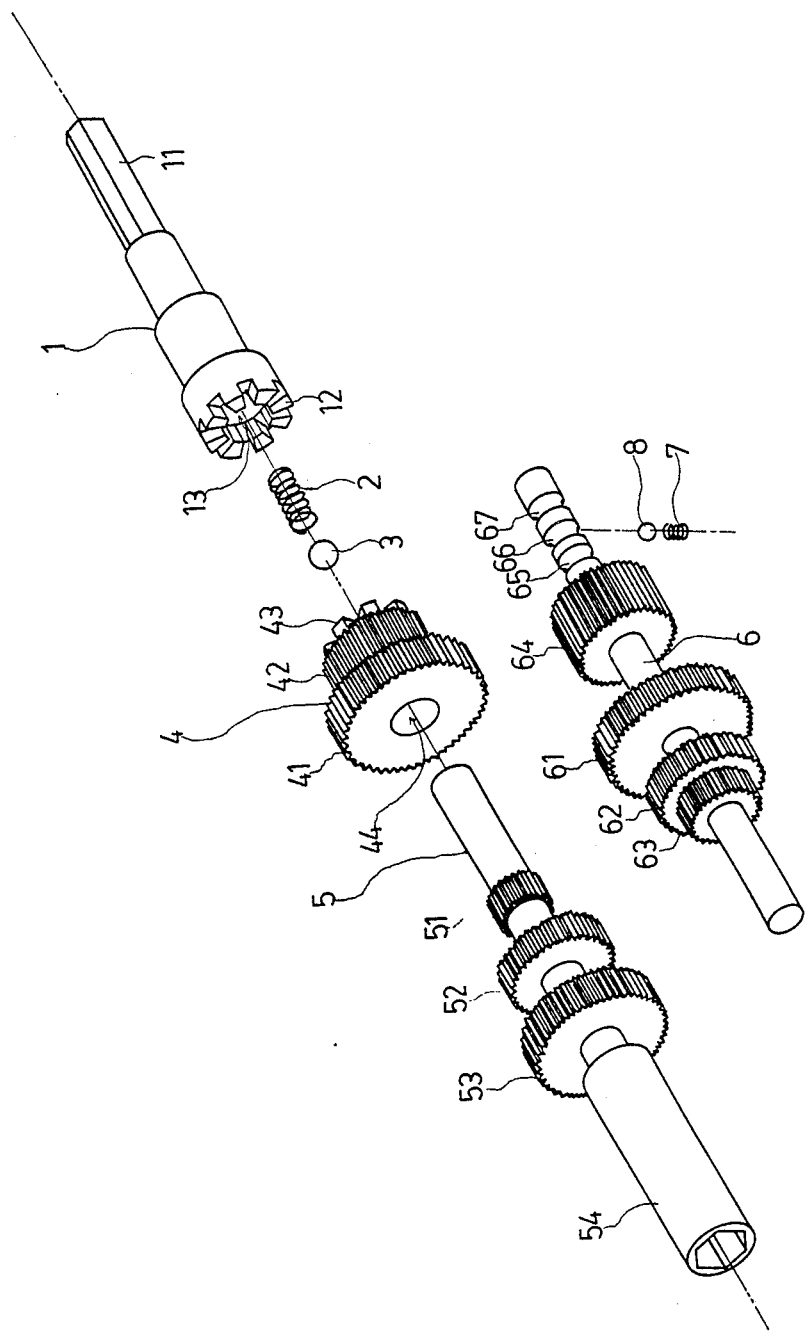
FIG. 1 is an exploded view illustrating elements of the preferred embodiment of the invention.

As indicated in FIG. 1, the present invention comprises an input shaft 1, an output or driving shaft 5 and a variable speed shaft 6. The first covered a main shaft 1, has one end made in the shape of a hexagonal lever 1, and is mainly used to sleeve and couple with various type of wrenches. The other end of the main shaft 1 is a circular concave/convex vertical tooth profile arrangement, in which a circular hole 13 is set, having a spring 2 and a springing body 3 set inside. The main shaft coupling gear 4 is comprised of two gears 41, 42 with each gear of a different dimension. One of its ends i.e. a contact end with main shaft 1, is having a gear 43 which is also circular in shape and or a circular concave/convex vertical tooth profile arrangement, which will match and be driven in accordance with the motion of the main shaft 1 to form a clutch installation a hollow circular hole 44 is set in the other end of gear set 41, 42. The forementioned hole 44 provides an access for sleeving through a driving shaft 5. Both of the shaft 5 and gear 41 are loosely engaged, so as not to hinder the revolving of the other. Three gear units 51, 52 and 53 of different dimensions are set at the driving shaft 5 to operate in engage with a gear unit of a variable speed shaft 6 for different speed combinations. In their right order is gear 51 at a change speed ratio of 1:7. It is, therefore, regarded as a quick speed section. The next gear 52, the speed of is 1:1. It is regarded as an equal speed section. The third is gear 53 which provides a speed ratio of 2:1 and is regarded as a slow speed section. However, its twisting force has been increased one time. At the other end of driving shaft 5 i.e. the output end, is a socket 54.

The variable speed shaft 6 is also comprised of three variable speed gear units. In their right order is gear 61 to engage with gear 51. Next comes gear 62 which engages with gear 52. The third one is gear 63 which engages with gear 53. Their inter linking-up will produce a variable speed function. A driven gear 64 is also attached with variable speed shaft 6. The forementioned driven gear 64 mainly engages with gear 42 of main shaft coupling gear 4 in such a way that it receives a twisting force passed by main shaft 1 and further pass the said force to the driving shaft 5 through the different speed sections of the variable speed gears 68, 62 and 6 of variable speed shaft 6. The variable speed shaft 6 is having three circular arc grooves, namely groove 65 which exerts a control over the quick speed section, groove 66 which controls the equal speed section and groove 67 which controls the slow speed section. Also set is a positioning ball 8 and a spring 7 which function to engage one of the grooves 65-67 and hold the shaft 6 stationary in each of the various speed sections.

Figure 3:
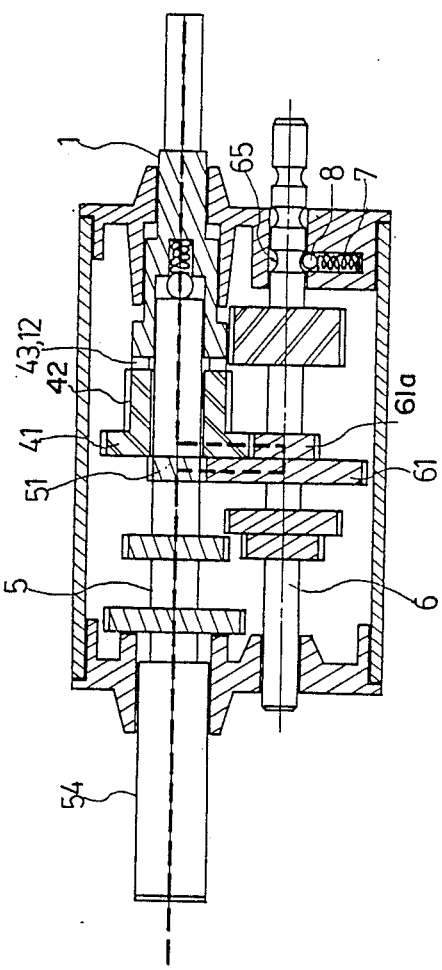
FIG. 3 is a plan view like FIG. 2, but showing the operative elements engaged in a first driving ratio.
Figure 2:
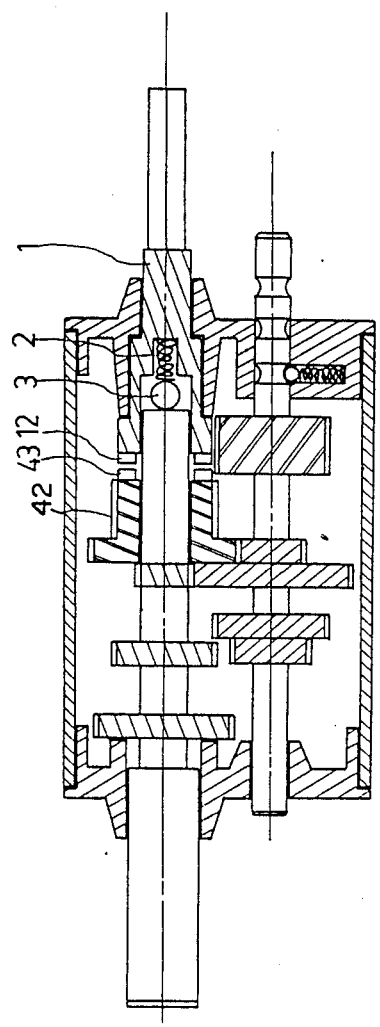
FIG. 2 is a plan view, partly in section showing an assembly of the elements of the invention as shown by FIG. 1.

The structural assembly and the application of its functions are illustrated in FIG. 2. When the present invention is not being used, the springing ball body 3 and spring 2 will cast the main shaft 1 away from the driving shaft 5 to cause the tooth profile arrangement 12 of the main shaft 1 to separate from the opposed tooth profile arrangement of the main shaft coupling gear 4, so that the clutch of the main shaft will be in idle running. When the present invention, is to be used a pressure is exerted on main shaft 1, i.e. to exert a pressure downward to turn the screw, the tooth profile arrangement 12 of main shaft 1 will engage with the tooth profile arrangement 43 of main shaft coupling gear 4, and torque applied to the main shaft is further conveyed to the variable speed gear 61 of the variable speed shaft 6, and then further conveyed to the gear 51 of the driving shaft 5 and, last of all, will be conveyed from socket 54 to the screw. The route of torque transmission is indicated by the dashed line in FIG. 3. At this time, owing to the fact the gear 61 of variable speed shaft 6 and the gear 51 of driving shaft 5 engage at a speed ratio of 1:7, it is being operated under a quick speed section. Therefore, when the main shaft 1 is revolving for one circle, the driving shaft 5 can revolve for seven circles, and is thus capable of achieving the object of rapidly installing or unfixing a screw.

As indicated in FIG. 4, when variable speed shaft 6 is moved toward the left, i.e. the positioning ball 8 and grooves are out of interengagement, gear 61 will separate from main shaft coupling gear 4 and gear 51. Gear 64 and main shaft coupling gear 42 will then engage with each other and gear 62 will engage. At this time, the matching ratio of the gear 52 to gear 53 1:1 and it is operating in an equal speed section. That is, when the main shaft 1 is revolving for one circle, the driving shaft 5 is also revolving for one circle. The route of torque transmission is indicated by the dashed line.

As indicated in FIG. 5, the variable speed shaft 6 may again be moved toward the left to cause the positioning ball 8 to engage with groove 67 and gear 62 will be separated from gear 52 and cause gear 63 to engage with gear 53. At this time, the matching ratio of the gear 53 to gear 63 is 2:1. It is operating as a slow speed section. that is to say, when main shaft 1 is revolving for one circle, the driving shaft 5 will only revolve for half a circle. However, the twisting force of driving shaft 5 will be increased one time. When the screw happened to be disengaged with the thread or frozen as a result of rusting, it can be easily unfixed. In the same manner, it can be easily screwed tightly without applying too large a force.

The present invention provides a supplemental or accessory device which is applicable to various kinds of tools, such as an adjustable wrench, hexagon wrench, universal wrench or automatic type of wrench. As for the output shaft part denoting by the socket 54, it is applicable to various kinds of tools, such as the crosshead type screw driver 91, the phillips type screw driver 92, the small sized internal hexagonal socket 93, the large sized internal hexagonal socket 94, the small sized hexagonal screw driver 95, and the large sized hexagonal screw driver 96, shown as by FIGS. 6A-6F respectively.

Summarizing the above-mentioned description, it can be seen that the present invention provides a novel and meritorious multi-section controlled supplementary device for a wrench.

What is claimed is:

1. A multi-speed drive accessory for a tool comprising:
   a first shaft (1) having first clutch means (12) at one end thereof,
   an output shaft (5),
   a coupling member (4) including two coupling gears (41, 42) of different diameters and a second clutch means (43) adapted for axial movement into and out of engagement with said first clutch means (12), said coupling member having a bore therethrough,
   means (2) biasing said first clutch means to a position where said first clutch means is disengaged from said second clutch means,
   one end of said output shaft being sleeved in said bore of said coupling member for rotary movement relative to said first shaft and another end of said output shaft having means for mounting a rotary driving tool,
   a plurality of driven gears (51, 52, 53) axially spaced along said output shaft, each of said driven gears being of a diameter different from the other driven gears and being fixed for rotation with said output shaft,
   a housing, means coaxially mounting said first shaft (1) and said output shaft (5) for rotation relative to said housing,
   a transfer shaft (6), said transfer shaft being mounted to said housing for axial and rotary movement relative to an axis parallel to an axis of rotation of said first shaft and said output shaft,
   two transfer gears (61a, 64) fixed for rotation with said transfer shaft, said transfer gears being axially spaced on said transfer shaft and of such different diameters that each of said transfer gears will engage one of said coupling gears (41, 42) when said transfer shaft (6) is axially moved to one of a predetermined number of axial positions,
   a plurality of driving gears (61, 62, 63) axially spaced along said transfer shaft, each of said driving gears (61, 62, 63) being axially spaced and of such a diameter that one of said driving gears (61, 62, 63) will move into meshing engagement with one of said driven gears (51, 52, 53) when said transfer shaft (6) is axially moved to one of said predetermined axial positions, and
   detent means (8, 65, 66, 67) for holding said transfer shaft (6) in any one of said predetermined axial positions.

2. The multi-speed drive accessory defined by claim 1 wherein said first shaft (1) further includes a circular recess internal of said first clutch means (12) and said means biasing said first clutch means (12) includes a spring (2) and a bearing (3) located internally of said circular recess.

3. The multi-speed drive accessory defined by claim 2 wherein said bearing (3) is biased by said spring (2) against said one end of said output shaft (5).

4. The multi-speed drive accessory defined by claim 1 wherein said transfer shaft (6) includes three spaced detents, said housing includes a bore disposed opposite said transfer shaft and said detent means include a latch member and a spring located in said housing bore and said latch member is biased into engagement with one of said spaced detents.

5. The multi-speed drive accessory defined by claim 4 wherein said spaced detents are gooves extending circumferentially around said transfer shaft (6) and said latch member is a ball bearing.

* * * * *